United States Patent
Hayashi et al.

(10) Patent No.: US 7,273,318 B2
(45) Date of Patent: Sep. 25, 2007

(54) THRUST NEEDLE ROLLER BEARING AND METHOD FOR MANUFACTURE THEREOF

(75) Inventors: Tetsuya Hayashi, Iwata (JP); Kousuke Obayashi, Iwata (JP); Shinji Oishi, Iwata (JP)

(73) Assignee: NTN Corporation (JP)

( * ) Notice: Subject to any disclaimer, the term of this patent is extended or adjusted under 35 U.S.C. 154(b) by 390 days.

(21) Appl. No.: 10/611,030

(22) Filed: Jul. 1, 2003

(65) Prior Publication Data

US 2004/0052440 A1 Mar. 18, 2004

(30) Foreign Application Priority Data

| Jul. 1, 2002 | (JP) | ............................. 2002-192011 |
| Jul. 8, 2002 | (JP) | ............................. 2002-198135 |
| Jul. 10, 2002 | (JP) | ............................. 2002-201257 |
| Dec. 11, 2002 | (JP) | ............................. 2002-358918 |

(51) Int. Cl.
*F16C 33/46* (2006.01)
*F16C 19/30* (2006.01)

(52) U.S. Cl. ...................................... 384/623; 384/619

(58) Field of Classification Search ................ 384/623, 384/590, 593, 614, 618, 621, 625; 29/898.067
See application file for complete search history.

(56) References Cited

U.S. PATENT DOCUMENTS

| 811,136 | A | * | 1/1906 | Eveland ....................... 384/618 |
| 2,959,458 | A | * | 11/1960 | Kaye ........................... 384/608 |
| 2,978,282 | A | * | 4/1961 | Fisher ......................... 384/623 |
| 3,163,478 | A | * | 12/1964 | Pitner .......................... 384/623 |
| 3,226,170 | A | * | 12/1965 | Neese .......................... 384/623 |
| 3,572,862 | A | * | 3/1971 | Teramachi ................... 384/621 |
| 3,913,994 | A | * | 10/1975 | Alling et al. ................. 384/623 |
| 6,506,121 | B2 | * | 1/2003 | Kobayashi et al. .......... 464/145 |
| 7,033,083 | B2 | * | 4/2006 | Obayashi et al. ............ 384/623 |

FOREIGN PATENT DOCUMENTS

| DE | 3134625 A1 * | 4/1983 |
| JP | 2002-70872 | 3/2002 |

* cited by examiner

*Primary Examiner*—Thomas R. Hannon
*Assistant Examiner*—Justin Krause
(74) *Attorney, Agent, or Firm*—Harness, Dickey & Pierce, P.L.C.

(57) ABSTRACT

A thrust needle roller bearing and a method for manufacturing the bearing with improved lubricant circulating ability, reduced drilling abrasion of the cage, and improved durability of the bearing has a plurality of needle rollers and two annular cages. Each of the cages is formed with a plurality of pockets. Each pocket has a radial length longer than the height of the roller. The two annular cages hold the needle rollers by sandwiching them between the cages within roller holding portions formed in the pockets. The radial length of each of the roller holding portions of the cages is formed shorter than the height of the roller. The two cages are assembled by folding them as a unit so that both the portions of the unit on either radially outer and inner side of the roller holding portions have their axial thickness smaller than that of the roller holding portions. The two cages are secured to one another at both their radially outermost and innermost end portions.

15 Claims, 10 Drawing Sheets

(a)

(b)

(c)

THRUST NEEDLE ROLLER BEARING AND METHOD FOR MANUFACTURE THEREOF

CROSS-REFERENCE TO RELATED APPLICATIONS

This application claims priority to Japanese Patent Application Nos. 2002-192011 filed Jul. 1, 2002; 2002-198135 filed Jul. 8, 2002; 2002-201257 filed Jul. 10, 2002 and 2002-358918 filed Dec. 11, 2002, which applications are herein expressly incorporated by reference.

FIELD OF THE INVENTION

The present invention relates to a thrust needle roller bearing used for an automatic transmission of a vehicle, a compressor and the like and a method for manufacturing it.

BACKGROUND OF THE INVENTION

The thrust needle roller bearing is formed generally by needle rollers, cages and raceway rings. These bearings have high load capacity and high rigidity nevertheless of its small projection area of bearing since it has a structure of line contact between the needle roller and the raceway ring. Accordingly, it is suited for bearing uses under severe conditions such as lean lubricant and high speed rotation. Thus, they are widely used as bearings for vehicle automatic transmissions and air compressors.

A thrust roller bearing is known which intends to increase the lubricant flow rate per unit time passing therethrough by improving at least one of the flow-in and flow-out abilities of lubricant (see Japanese Laid-open Patent Publication No. 70872/2002). FIG. 12(*a*) is a partial plan view showing a thrust roller bearing 50 of the prior art. FIG. 12(*b*) is a cross-sectional view along a line XIIb-XIIb in FIG. 12(*a*). FIG. 12(*c*) is a cross-sectional view along a line XIIc-XIIc in FIG. 12(*b*). The thrust needle roller bearing 50 has a plurality of needle rollers 80 and two annular cages 60 and 70. Each of the cages 60 and 70 has a plurality of windows 61 and 71 longer than a length "l" of the rollers 80. Roller holding portions 64 and 74 are formed in the windows 61 and 74 and sandwich the needle rollers 80 therebetween. The radial length "la" of each of the roller holding portions 64 and 74 of the cages 60 and 70 is formed shorter than the height "l" of the rollers 80. The two cages 60 and 70 are assembled by folding them as a unit. Thus, at least one of the portions of the unit on either radially outer and inner side of the roller holding portions 64 and 74 have their axial thickness "t1" and "t2" smaller than that "t0" of the roller holding portions 64 and 74.

The reduced thickness of the radially outer and inner side of the roller holding portions 64 and 74 makes it possible to improve the flow-in ability or the flow-out ability of the lubricant on at least one side of the roller holding portions. Thus, this increases the lubricant flow rate per a unit time passing through the bearing.

However, in the thrust needle roller bearing 50 of the prior art, the two cages 60 and 70 are assembled by superimposing radially outward flat portions 62 and 72 upon one another. The radially innermost ends 67 and 77 of the radially inner flat portions 63 and 73 are folded. Finally, the radially innermost end 67 is caulked onto the other radially innermost end 77. Such a structure permits easy separation of the superimposed flat portions 62 and 72. This causes undue stress in the caulked portion and therefore lowers or diminishes the holding ability of the needle rollers 80.

In addition, it is impossible to obtain a wide contact area between the needle bearings 80 and the windows 61 and 71 of the cages 60 and 70 at the caulking side of the radially inward flat portions 63 and 73. Thus, a drilling abrasion or an abnormal abrasion is caused in the windows 61 and 71 by an urging force of the needle rollers 80 against the wall surface of the windows 61 and 71 by the centrifugal force. This is in addition to the abrasion caused by the self-rotation of the rollers 80.

Furthermore, since two cages 60 and 70 are secured only by folding the radially innermost end 67 and by caulking it onto the other radially innermost end 77, the securing force therebetween is influenced by the dimension of the end surface. Thus, the dispersion of flatness is diminished especially at the radially innermost end 67.

SUMMARY OF THE INVENTION

It is, therefore, an object of the present invention to provide a thrust needle roller bearing and a method for manufacturing the bearing where the circulating ability of lubricant can be improved, the drilling abrasion of the cage is reduced, and the durability of the bearing is improved.

According to the present invention, a thrust needle roller bearing comprising a plurality of needle rollers and two annular cages. Each of the cages is formed with a plurality of pockets each having a radial length longer than the height of the roller. The two annular cages hold the needle rollers by sandwiching them between the cages within roller holding portions formed in the pockets. The radial length of each of the roller holding portions of the cages is formed shorter than the height of the roller. The two cages are assembled by folding them as a unit so that both the portions of the unit on either radially outer and inner side of the roller holding portions have their axial thickness smaller than that of the roller holding portions. The two cages are secured to one another at both their radially outermost and innermost end portions.

Since the two cages are assembled by folding them as a unit so that both the portions of the unit on either radially outer and inner side of the roller holding portions have their axial thickness smaller than that of the roller holding portions, it is possible to improve not only the flow-out ability of lubricant but its flow-in ability. Accordingly, this makes it possible to securely prevent seizure of parts forming the bearing and also to diminish the drilling abrasion between the end surface of the needle roller and the pocket of the cages. In addition, the temperature rise due to residence of lubricant is also prevented. The durability of the bearing can be improved by securing two cages to one another at both their radially outermost and innermost end portions.

It is preferable that the two cages are superimposed on one another at portions either radially outer and inner side of the roller holding portions. This structure enables further improvements to both the flow-out and flow-in abilities of lubricant either radially outer and inner side of the roller holding portions and thus further improve the drilling abrasion between the end surface of the needle roller and the pocket of the cages.

When two cages are secured to one another by plastically deforming their radially outermost and innermost end portions, it is possible to assemble the bearing during a press step to form the cages and-thus to lower the manufacturing cost.

It is possible to secure the two cages to one another by caulking the radially outermost and innermost end portions of either one of the two cages to the other one. Also, the two cages may be secured to one another by caulking either one of the radially outermost and innermost end portions of the two cages. Since the cages can be rigidly secured by caulking, it is possible to prevent the separation of the needle rollers from the cages.

It is preferable that the two cages are secured to one another by partially caulking them at several positions along the periphery of the two cages. This simplifies the caulking operation and also prevents the influence of the caulking from deforming the cages. Such a influence can be further reduced by carrying out the caulking at equidistance and out of phase positions along the periphery of the cages.

It is preferable that the two cages are secured to one another by folding the radially outermost and innermost end portions of either one of the two cages onto the other one. Also, the two cages may be secured to one another by folding either one of the radially outermost and innermost end portions of the two cages. The two cages can be rigidly secured by folding and thus separation of the needle rollers from the cages can be prevented. In addition, it becomes easy to set the axial thickness of the secured portion. Also, it is possible to reduce the contact surface pressure against a mating parts such as a shaft or the like. Further, the invention improves the durability of the bearing while preventing abnormal abrasion or surface peeling of parts.

It is preferable that the axial thickness of the secured portions is at least 3 times the plate thickness of each cage. This enables a remarkable increase in the contact area as compared to prior art bearings. Thus, this reduces the contact surface pressure against a mating part such as a shaft and the like. Also, this diminishes the drilling abrasion between the end faces of needle rollers and the pockets of the cages.

When the two cages are secured to one another by spot welding, it is possible to rigidly secure the two cages. This also prevents the deformation of the cages during the assembly of the bearing.

It is preferable that notches are formed at the periphery of one of the two cages. Projections, each engaging one of the notches, are formed at the periphery of the other of the two cages. This prevents shift of pitch of the pockets of two cages during the caulking operation and thus guides the needle rollers with high accuracy and stability.

It is preferable that corners of the roller holding portions are smoothly rounded. This enables a stable guide and hold of the needle rollers without cutting a film of lubricant formed on the surface of the rollers.

It is preferable that double row needle rollers are arranged within each pocket of the cage. This suppresses the differential slippage of the needle rollers and thus improves the durability of the bearing while preventing generation of damages and peeling of surfaces of parts.

It is preferable that the needle roller arranged radially outward of the double row needle rollers has a length longer than that of the needle roller arranged radially inward. This suppresses the differential slippage of the needle rollers on the radially inward side. Thus, this increases the load capacity of the rollers oh the radially outward side to a desired load capacity.

It is also preferable that the entire surface of the cage is formed with a hardened layer having a surface hardness of more than 600 Hv. This further suppresses the drilling abrasion as well as the abrasion in the guiding surface. Thus, this further improves the strength of the cages and the durability of the bearing.

According to another aspect of the present invention, a method for manufacturing a thrust needle roller bearing comprises the steps of stamping a plurality of pockets radially extending in each of two cages. Each has a length longer than that of a thrust needle roller. The needle rollers are sandwiched between two cages within roller holding portions formed in the pockets. The two cages are folded and assembled as a unit so that both the portions of the unit on either radially outer and inner side of the roller holding portions have their axial thickness smaller than that of the roller holding portions. The two cages are secured to one another at at least the radially innermost end portion. After assembling the plurality of needle rollers within the roller holding portions of the two cages, a carburizing hardening treatment, a tempering treatment or a carbonitriding treatment of the assembly is carried out.

It is possible to keep the surface hardness required for the cages and to suppress the drilling abrasion and the like and thus to improve the durability of the cages by carrying out a carburizing hardening treatment, a tempering or a carbonitriding treatment of the assembly after having assembled the plurality of needle rollers within the roller holding portions of two cages;

It is preferable that the needle rollers, having already been hardened and tempered, are assembled in the two cages which have not yet been hardened. This simplifies the manufacturing steps of the bearing and also improves the reliability of the quality of the bearing. Accordingly, this maintains a predetermined durability of the bearing itself under severe circumstances.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

The following description of the preferred embodiment(s) is merely exemplary in nature and is in no way intended to limit the invention, its application, or uses.

Figure 1:
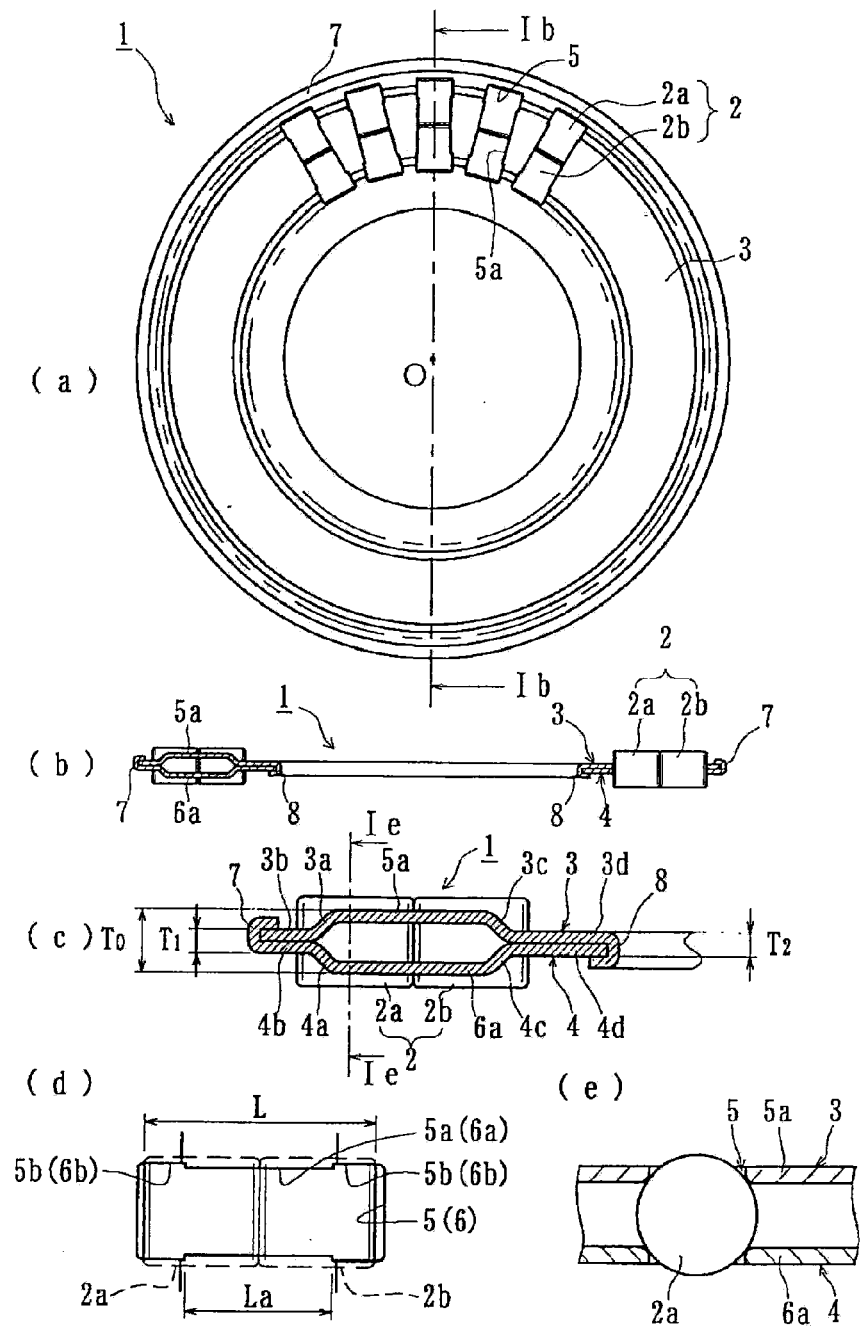
FIG. 1(a) is a plan view of a first embodiment of a thrust needle roller bearing according to the present invention.
FIG. 1(b) is a cross-section view taken along a line Ib-Ib in FIG. 1(a)
FIG. 1(c) is a partially enlarged view of FIG. 1(b)
FIG. 1(d) is a partially enlarged view of a pocket portion in FIG. 1(a)
FIG. 1(e) is an enlarged cross-section view taken along a line Ie-Ie in FIG. 1(c)
FIG. 1(f) is a view like FIG. 1(d) with the rollers having different sizes.

FIG. 1(a) is a plan view of a first embodiment of a thrust needle roller bearing according to the present invention. FIG. 1(b) is a cross-section view taken along a line Ib-Ib in FIG. 1(a). FIG. 1(c) is a partially enlarged view of FIG. 1(b). FIG. 1(d) is a partially enlarged view of a pocket portion in FIG. 1(a). FIG. 1(e) is an enlarged cross-section view taken along a line Ie-Ie in FIG. 1(c).

The thrust needle roller bearing 1 has a plurality of needle rollers 2 and two annular cages 3 and 4 holding the needle rollers 2 at a predetermined pitch along the periphery of the cases. The two cages 3 and 4 have a plurality of pockets 5 and 6, respectively. Each pocket has an elongated rectangular configuration having a length in a radial direction longer than the length or height "L" of each needle roller. The cages 3 and 4 are press formed from a steel sheet, for example, of cold rolled steel (SPCC). Either side of each pocket 5 and 6 is formed with oppositely projected roller holding portions 5a and 6a which sandwich the needle rollers 2 therebetween. The cages 3 and 4 may also be formed by drawing from a band steel such as SCM 415.

Each of the needle rollers 2 is formed by a radially outward needle roller 2a and a radially inward needle roller 2b. Rollers 2a and 2b are arranged within pockets 5 and 6 in a double row configuration. This reduces any difference in the peripheral velocity between the radially outward rollers and the radially inward roller to suppress slippage of the rollers relative to the raceway surfaces (not shown). This prevents generation of damages (smearing) or peeling of surfaces of parts of the bearing. Although it is illustrated in the example embodiment that the radially outward and radially inward rollers 2a and 2b have the same length, it is possible to make the length (i.e. height) of the radially outward rollers 2a longer (e.g. 1.2 times) than that of the radially inward rollers 2b. This increases the load capacity of the radially outward rollers 2b. In addition, although it is illustrated that the rollers 2a and 2b have a flat end face, it may be possible to use an end face of a spherical projection or a combination of a flat end face and a spherical end face.

As shown in FIG. 1(d), the length "La" in a radial direction of the roller holding portions 5a and 6a is shorter than the height "L" of rollers 2. Recessed portions 5b and 6b are formed on both sides of the roller holding portions 5a and 6a to enable easy passage of lubricant therethrough. While the rollers 2 are shown as a double row configuration, they may be arranged in a single row configuration.

As shown in FIG. 1(e), corners of the roller holding portions 5a and 6a are rounded during a stamping step or smoothly rounded by a surface pressing process after the stamping. The rounded corners stably guide and hold the needle rollers 2a and 2b without cutting films of lubricant formed on the needle rollers 2a and 2b.

As shown in FIG. 1(c), a portion radially outward of the roller holding portion 5a of one (e.g. cage 3) of the two cages 3 and 4 has an inclined portion 3a folded at the radially outward end of the roller holding portion 5a. An outer flat portion 3b extends radially outward from the end of inclined portion 3a. Similarly, the cage 3 has, at the radially inward end of the roller holding portion 5a, an inclined portion 3c folded at the radially inward end of the roller holding portion 5a. An inner flat portion 3d extends radially inward from the end of inclined portion 3c.

The roller holding portion 6a of the other (i.e. cage 4) of the cages 3 and 4 can be pocket stamped by the same die used for punching the one cage 3. A portion radially outward of the roller holding portion 6a has an inclined portion 4a folded at the radially outward end of the roller holding portion 6a. An outer flat portion 4b extends radially outward from the end of inclined portion 4a. Similarly, the cage 4 has, at the radially inward end of the roller holding portion 6a, an inclined portion 4c folded at the radially inward end of the roller holding portion 6a. An inner flat portion 4d extends radially inward from the end of inclined portion 4c.

The two cages 3 and 4 are formed with a caulked portion 7 by superimposing the outer flat portions 3b and 4b upon one another and by folding the radially outermost end of the outer flat portion 4b over the other outer flat portion 3b. Similarly, a caulked portion 8 is formed by superimposing the inner flat portions 3d and 4d upon one another and by folding the radially innermost end of the inner flat portion 3d over the other inner flat portion 4d. Thus the two cages 3 and 4 are never separated from one another since they are strongly united at their radially outermost and innermost ends by the caulked portions 7 and 8. At the outer flat portions 3b and 4b and inner flat portions 3d and 4d, it is possible to suppress the drilling abrasion since a large contact area between the ends of the needle rollers 2 and the pockets 5 and 6 can be obtained.

When the two cages 3 and 4 are secured to one another, due to the presence of the inclined portions 3a, 4a and 3c, 4c, both an axial thickness "Ti" of the gradially outward portion of the roller holding portions 5a and 6a and an axial thickness "T2" of the radially outward portion of the roller holding portions 5a and 6a are smaller than an axial thickness "T0" of the roller holding portions 5a and 6a. Also, the outer flat portions 3b, 4b and inner flat portions 3d, 4d are axially offset from the roller holding portions 5a, 6a.

Figures 1F, 2:
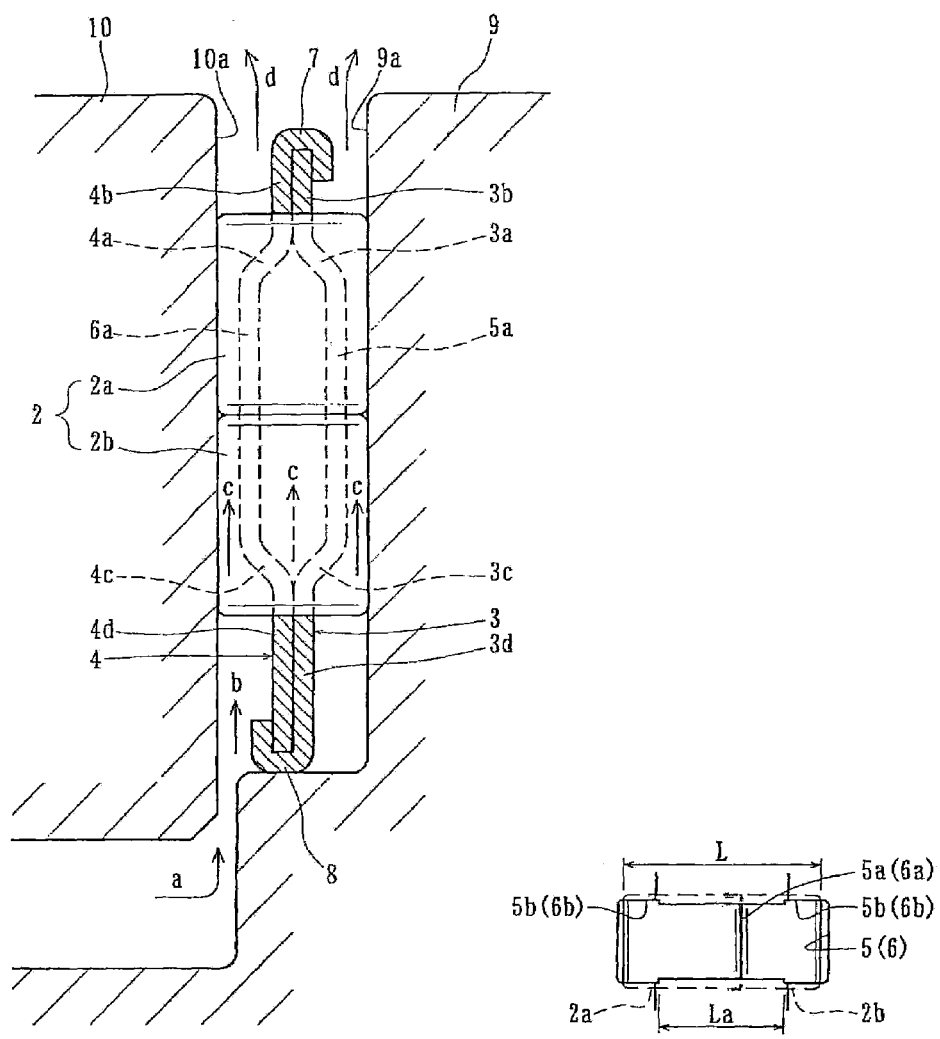
FIG. 2 is a partial cross-section view showing a condition of use of a thrust needle roller bearing of the present invention.

The thrust needle roller bearing 1, having a structure mentioned above, can be loose fitted with the caulked portion 8 acting as a guiding surface between a raceway surface 9a of a first shaft (rotational shaft) 9 and a raceway surface 10a of a second shaft (stational shaft) 10, as shown in FIG. 2. When the first shaft 9 rotates, the cages 3 and 4 are also rotated together with the first shaft 9. The needle rollers 2 are rotated between the raceway surface 9a of a first shaft 9 and the raceway surface 10a of a second shaft 10. The lubricant is supplied by a source (not shown) into the bearing 1 via an oil passage.

The lubricant can flow from the oil passage along a line "a" into a space between the raceway surface 10a of the second shaft 10 and the radially inward portion relative to the roller holding portion 6a of the cage 4 along a line "b". The lubricant can flow into a space formed by the rollers 2 and the cages 3 and 4 along lines "c". Lubricant is passed by a portion between rollers 2 and the roller holding portions 5a and 6a, a portion between the end surfaces and the roller holding portions 5a and 6a, and a portion between the rollers 2 and the raceway surfaces 9a and 10a. Finally, the lubricant is exhausted from a space between the raceway surface 10a of the second shaft 10 and the radially outward portion relative to the roller holding portion 6a and a space between the raceway surface 9a of the first shaft 9 and the radially outward portion relative to the roller holding portion 6a along lines "d".

Since the axial thickness "T1" of the radially outward portion relative to the roller holding portions 5a and 6a and the axial thickness "T2" of the radially inward portion relative to the roller holding portions 5a and 6a are smaller than the axial thickness "T0" of the roller holding portions 5a and 6a, the cross-section area of the space between the raceway surface 10a of the second shaft 10 and the roller holding portion 6a of the cage 4 is enlarged compared to the prior art. Accordingly, not only the flow-out ability of the lubricant but the flow-in ability is of the cages 3 and 4 is likewise improved. In addition, since the flow of lubricant is not interrupted by the cages 3 and 4 and thus the residence of lubricant within the cages 3 and 4 is prevented, it is possible to suppress a temperature rise of the lubricant and improve the durability of the bearing.

A method for manufacturing of the thrust needle roller bearing 1 according to the present invention will be hereinafter described in detail. Firstly, two cages 3 and 4 and needle rollers 2 including both hardening/tempering treated ones or non-hardening treated ones are combined with each other. The caulking portions 7 and 8 are formed by folding the radially outermost end of the flat portion 4b onto the other flat portion 3b and by folding the radially innermost end of the flat portion 3d onto the other flat portion 4d to securely unite the two cages 3 and 4. The needle rollers 2 are made for example of SUJ bearing steel such as high carbon chrome bearing steel I or II and are heat treated by oil hardening at 840° for 30 minutes and then by tempering at 180° for 90 minutes to obtain Vickers hardness (Hv) of 700~750.

The rollers 2 and two cages 3 and 4 in an assembled condition are finished after heat treatment of carburizing hardening/tempering or of carbonitriding hardening/tempering. In this case, the heat treatment is carried out under conditions of carburizing (850°, 35 minutes) within atmosphere of RX gas, of oil hardening, and of tempering (165°, 60 minutes). The bearing was heat treated by carbonitriding within atmosphere of RX gas containing ammonia of 1~3 volume % at 840~850° for 35 minutes and then by immediately quenching in oil.

In this case, it is possible to further increase the strength of the bearing by previously carrying out a soft-nitriding treatment at 570~580° for 35 minutes. It is possible to omit the preheat treatment of the needle rollers 2. However, if carrying out a pre-heat treatment such as immersed hardening before assembly, it is possible to further increase the strength of the bearing by the carburizing or carbonitriding treatment carried out later. This method can reduce manufacturing steps as compared with a method of the prior art in which the at least two cages 3 and 4 and needle rollers 2 are separately heat treated and then the caulked portions are annealed. When the cages 3 and 4 are soft-nitrided, it is possible to manufacture the bearing by separately heat treating the cages 3 and 4 and the needle rollers 2, by combining the cages 3 and 4 and the needle rollers, and then by caulking the cages 3 and 4.

The surface hardness of the needle rollers 2 is increased due to the formation of a carburized layer or a carbonitrided layer. Thus, roller impressions are not easily formed even if hard foreign matter is introduced into the bearing. This increases the life of the bearing. In the carbonitriding treatment, a nitrogen-rich layer is formed in which more than 20% volume of retained austenite is formed. This contributes to relieve stress concentrations at the impression caused by the hard foreign matter due to the presence of the high amount of the retained austenite. The nitrogen-rich layer may be formed as having a thickness of more than 0.1 mm and surface hardness of more than 750 Hv. In addition, entire strength of the needle bearings 2 can be improved by increasing the inside hardness of the rollers as same as their surface hardness. Accordingly, it is possible to use the bearing of the present invention under a severe condition while keeping a desired long life.

Similarly to the needle rollers 2, it is possible to have the surface hardness of the cages 3 and 4 at least more than 400 Hv or more than 600 Hv in accordance with the conditions of heat treatment by forming a carburized layer or a carbonitrided layer at their surface layer. Accordingly, the wear resistance of the cages 3 and 4 can be improved as compared with those of the prior art.

Figure 3:
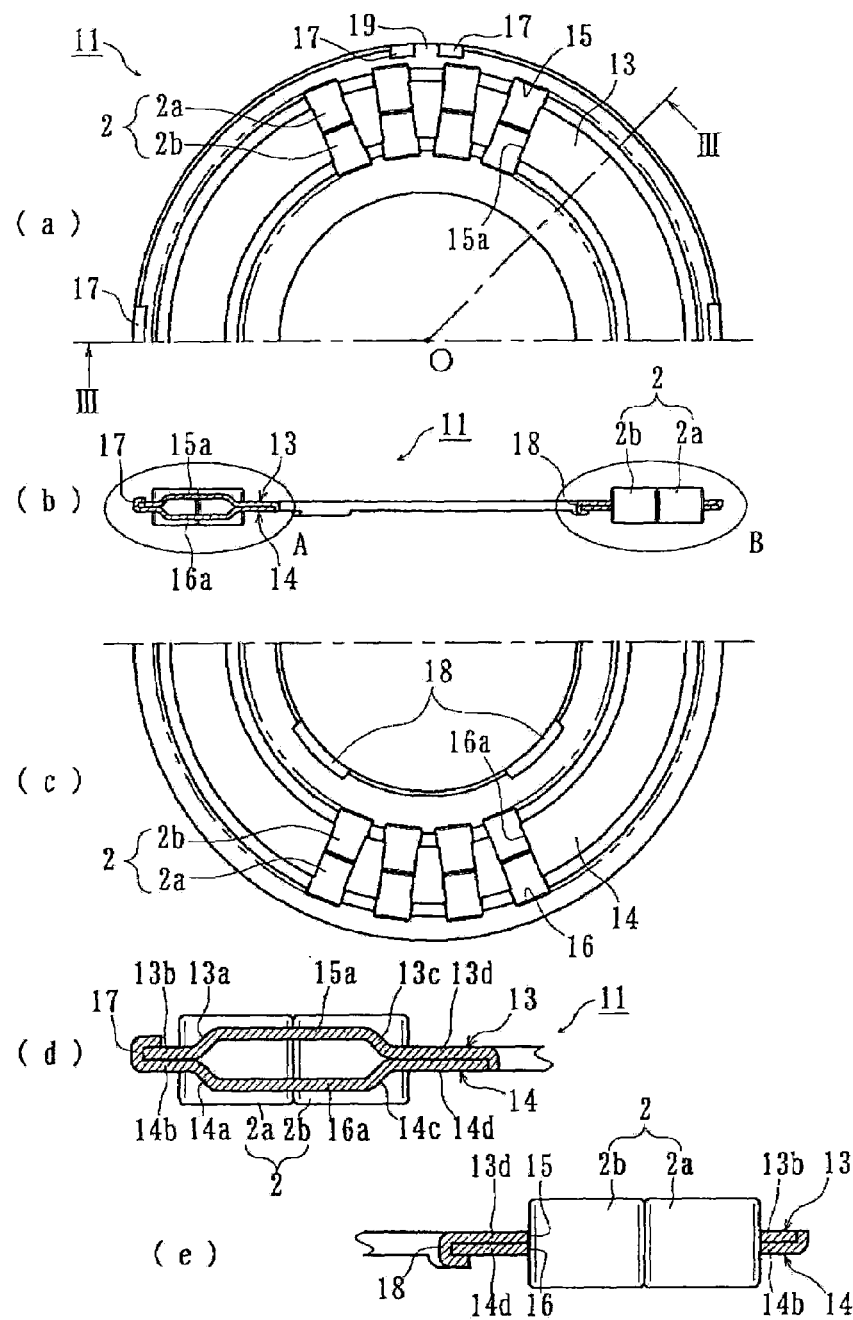
FIG. 3(a) is a plan view of a second embodiment of a thrust needle roller bearing according to the present invention.
FIG. 3(b) is a cross-section view taken along a line III-O-III in FIG. 3(a)
FIG. 3(c) is a bottom view of FIG. 3(a)
FIG. 3(d) is a partially enlarged view of a part "A" in FIG. 3(b)
FIG. 3(e) is a partially enlarged view of a part "B" in FIG. 3(b)

FIG. 3(a) is a plan view of a second embodiment of a thrust needle roller bearing according to the present invention. FIG. 3(b) is a cross-section view taken along a line III-O-III in FIG. 3(a). FIG. 3(c) is a bottom view of FIG. 3(a). FIG. 3(d) is a partially enlarged view of a part "A" in FIG. 3(b). FIG. 3(e) is a partially enlarged view of a part "B" in FIG. 3(b). The second embodiment is different from the first embodiment only in the configuration of the cages and the caulking. Thus, same parts in the second embodiment as those in the first embodiment are designated by same reference numerals used in the first embodiment.

The thrust needle roller bearing 11 has a plurality of needle rollers 2 and two annular cages 13 and 14 to hold the needle rollers 2 at a predetermined pitch along their periphery. As shown in FIG. 3(d), a radially outward portion of the roller holding portion 15a of one (e.g. cage 13) of the two cages 13 and 14 has an inclined portion 13a folded at the radially outward end of the roller holding portion 15a. An outer flat portion 13b extends radially outward from the end of inclined portion 13a.

Similarly, the cage 13 has, at the radially inward end of the roller holding portion 15a, an inclined portion 13c folded at the radially inward end of the roller holding portion 15a. An inner flat portion 13d extends radially inward from the end of inclined portion 13c. The roller holding portion 16a of the other (i.e. cage 14) of the cages 13 and 14 can be pocket stamped by the same die used for punching the other cage 13. A radially outward portion of the roller holding portion 16a has an inclined portion 14a folded at the radially outward end of the roller holding portion 16a. An outer flat portion 14b extends radially outward from the end of inclined portion 14a. Similarly, the cage 14 has, at the radially inward end of the roller holding portion 16a, an inclined portion 14c folded at the radially inward end of the roller holding portion 16a. An inner flat portion 14d extends radially inward from the end of inclined portion 14c.

As shown in FIG. 3(d), the two cages 13 and 14 are formed with a caulked portion 17. The outer flat portions 13b and 14b are superimposed upon one another and the radially outermost end of the outer flat portion 14b is folded onto the other outer flat portion 13b. On the other hand, the inner flat portions 13d and 14d are superimposed upon one another and the radially innermost end of the inner flat portion 13d is folded axially. In addition, as shown in FIG. 3(e), the outer flat portions 13b and 14b are superimposed upon one another and the radially outermost end of the outer flat portion 14b is folded axially. Furthermore, a caulked portion 18 is formed by superimposing the inner flat portions 13d and 14d upon one another and folding the radially innermost end of the inner flat portion 13d over the other inner flat portion 14d. Thus, the two cages 13 and 14 are strongly united at their radially outermost and innermost ends by the caulked portions 17 and 18. The partial caulking of this embodiment can remarkably simplify the caulking operation as compared with the entire periphery caulking of the first embodiment.

A reference numeral 19 denotes a positioning portion for aligning a phase between the two cages 13 and 14. The positioning portion 19 is formed for example by notches (not shown) formed at the periphery of one (e.g. cage 13) of the two cages 13 and 14 and by projections (not shown) formed at the periphery of the other (e.g. cage 14) of the two cages 13 and 14. Each of the notches and projections engages each other to prevent shifting of the pitch of the pockets 15 and 16 of the cages 13 and 14 during manufacturing operations such as caulking. The partial caulking portions 17 and 18 are arranged at 4 positions on the periphery of the cages 13 and 14 with shifting the phase by 45° to prevent deformation of the cages during the caulking operation. The number of caulking position is not limited to 4, and 5 through 8 positions may be adopted.

Figure 4:
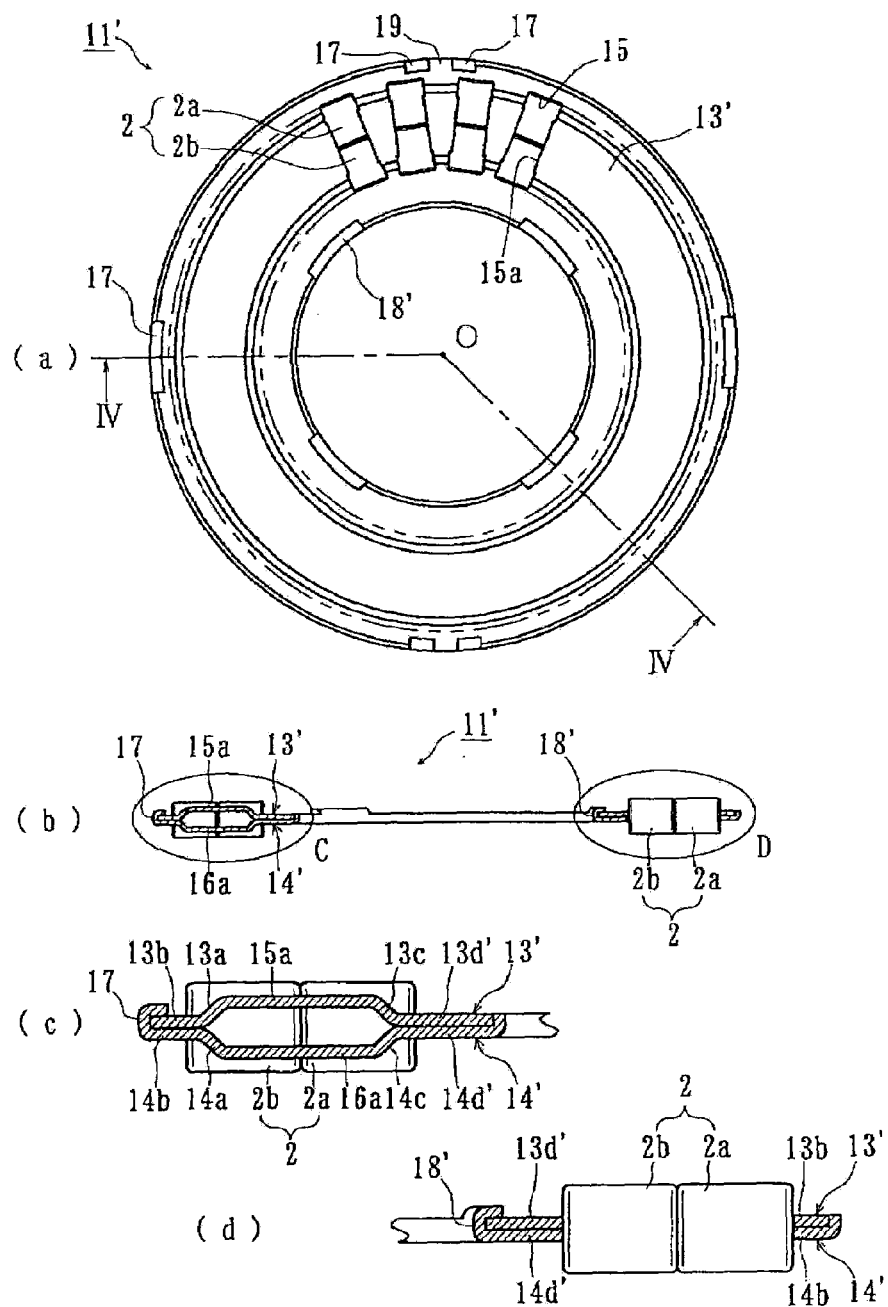
FIG. 4(a) is a plan view of a third embodiment of a thrust needle roller bearing according to the present invention.
FIG. 4(b) is a cross-section view taken along a line IV-O-IV in FIG. 4(a)
FIG. 4(c) is a partially enlarged view of a part "C" in FIG. 4(b)
FIG. 4(d) is a partially enlarged view of a part "D" in FIG. 4(b)

FIG. 4(a) is a plan view of a third embodiment of a thrust needle roller bearing according to the present invention. FIG. 4(b) is a cross-section view taken along a line IV-O-IV in FIG. 4(a). FIG. 4(c) is a partially enlarged view of a part "C" in FIG. 4(b). FIG. 4(d) is a partially enlarged view of a part "D" in FIG. 4(b). The third embodiment is different from the second embodiment only in the direction of caulking. Same parts of the third embodiment as those in the second embodiment are designated by the same reference numerals used in the second embodiment and accordingly the detailed description will be omitted.

The thrust needle roller bearing 11' comprises a plurality of needle rollers 2 and two annular cages 13' and 14' to hold the needle rollers 2 at a predetermined pitch along their periphery. As shown in FIG. 4(c), a radially outward portion of the roller holding portion 15a of one (e.g. cage 13') of the two cages 13' and 14' has an inclined portion 13a folded at the radially outward end of the roller holding portion 15a. An outer flat portion 13b extends radially outward from the end of inclined portion 13a. Similarly, the cage 13' has, at the radially inward end of the roller holding portion 15a, an inclined portion 13c folded at the radially inward end of the roller holding portion 15a. An inner flat portion 13d' extends radially inward from the end of inclined portion 13c.

A portion radially outward of the roller holding portion 16a of the other (i.e. cage 14') of the cages 13' and 14' has an inclined portion 14a folded at the radially outward end of the roller holding portion 16a. An outer flat portion 14b extends radially outward from the end of inclined portion 14a. Similarly, the cage 14' has, at the radially inward end of the roller holding portion 16a, an inclined portion 14c folded from the radially inward end of the roller holding portion 16a. An inner flat portion 14d' extends radially inward from the end of inclined portion 14c.

As shown in FIG. 4(c), the two cages 13' and 14' are formed with a caulked portion 17. The outer flat portions 13b and 14b are superimposed upon one another and one portion of the radially outermost end of the outer flat portion 14b is folded onto the other outer flat portion 13b. On the other hand, the inner flat portions 13d' and 14d' are superimposed upon one another and the radially innermost end of the inner flat portion 14d' is folded axially. In addition, as shown in FIG. 4(d), the inner flat portions 13d' and 14d' are superimposed upon one another and a portion of the radially innermost end of the inner flat portion 14d' is folded axially to form a partially caulked portion 18'. Thus the two cages 13' and 14' are strongly united at their radially outermost and innermost ends by the caulked portions 17 and 18'. The partial caulking of this embodiment is different from that of the second embodiment in that the partial caulked portions of this embodiment reside on one side of the cages and thus the caulking operation can be further simplified.

Figure 5:
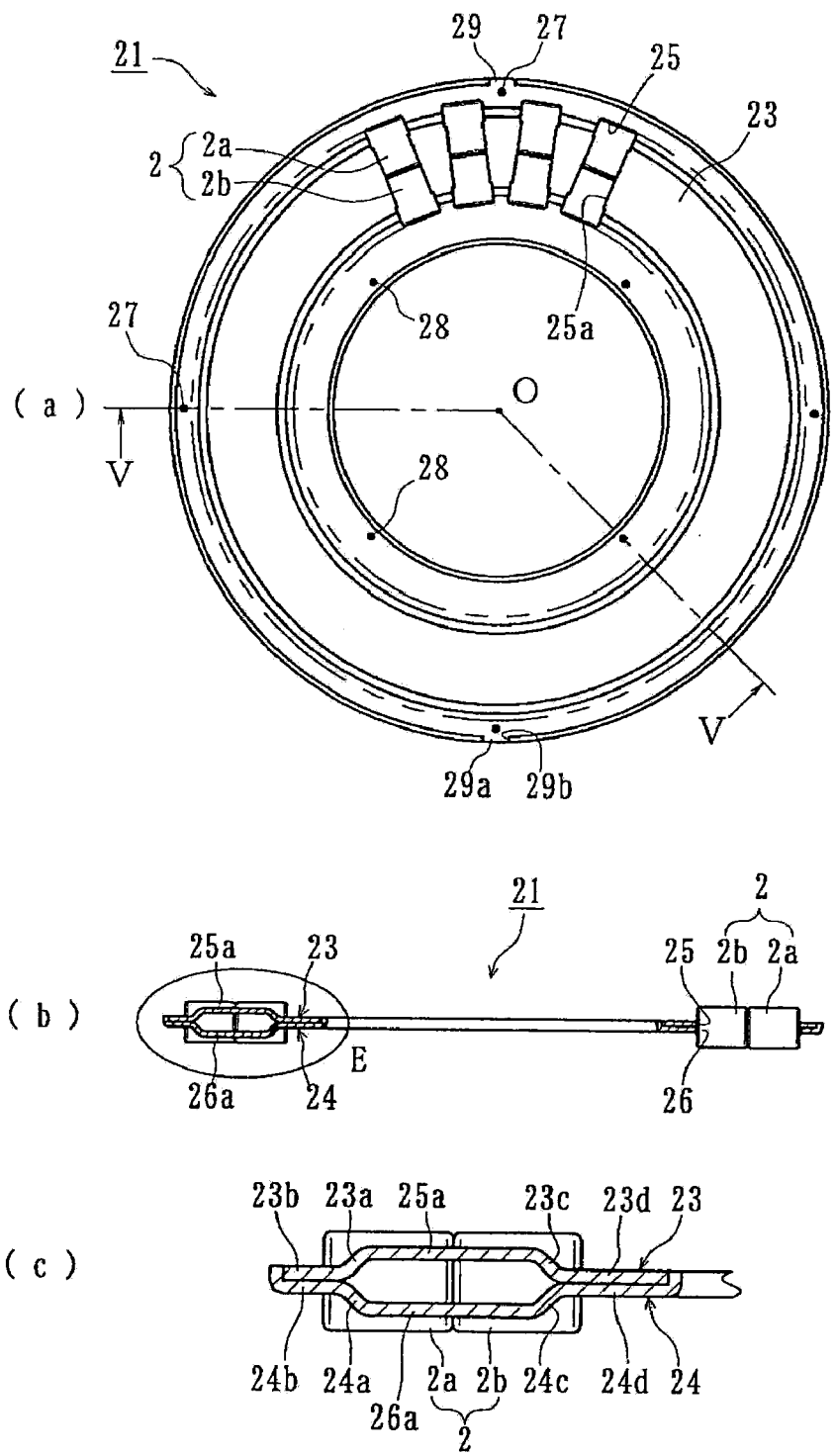
FIG. 5(a) is a plan view of a fourth embodiment of a thrust needle roller bearing according to the present invention.
FIG. 5(b) is a cross-section view taken along a line V-O-V in FIG. 5(a)
FIG. 5(c) is a partially enlarged view of a part "E" in FIG. 5(b)

FIG. 5(a) is a plan view of a fourth embodiment of a thrust needle roller bearing according to the present invention. FIG. 5(b) is a cross-section view taken along a line V-O-V in FIG. 5(a). FIG. 5(c) is a partially enlarged view of a part "E" in FIG. 5(b). The fourth embodiment is different from the first through third embodiments only in the securing member of the two cages. Accordingly, the same parts as those in the of the first through third embodiments are designated by the same reference numerals in this embodiment.

The thrust needle roller bearing 21 has a plurality of needle rollers 2 and two annular cages 23 and 24 to hold the needle rollers 2 at a predetermined pitch along their periphery. As shown in FIG. 5(c), a radially outward portion of the roller holding portion 25a of one (e.g. cage 23) of the two cages 23 and 24 has an inclined portion 23a folded at the radially outward end of the roller holding portion 25a. An outer flat portion 23b extends radially outward from the end of inclined portion 23a. Similarly, the cage 23 has, at the radially inward end of the roller holding portion 25a, an inclined portion 23c folded at the radially inward end of the roller holding portion 25a. An inner flat portion 23d extends radially inward from the end of inclined portion 23c.

A radially outward portion of the roller holding portion 26a of the other (i.e. cage 24) of the cages 23 and 24 has an inclined portion 24a folded at the radially outward end of the roller holding portion 26a. An outer flat portion 24b extends radially outward from the end of inclined portion 24a. Similarly, the cage 24 has, at the radially inward end of the roller holding portion 26a, an inclined portion 24c folded at the radially inward end of the roller holding portion 26a. An inner flat portion 24d extends radially inward from the end of inclined portion 24c.

As shown in FIG. 5(c), the outer flat portions 23b and 24b are superimposed upon one another and the radially outermost end of the outer flat portion 24b is folded axially. Similarly, the inner flat portions 23d and 24d are superimposed upon one another and the radially innermost end of the inner flat portion 24d is folded axially. The radially innermost end of the inner flat portion may be folded axially. In the fourth embodiment, the two cages 23 and 24 are secured by welding their outer peripheral portion and inner peripheral portion at points 27 and 28. These welded portions 27 and 28 are arranged at 4 positions on the periphery of the cages 23 and 24 with shifting the phase by 45° to prevent deformation of the cages during the welding operation.

A reference numeral 29 denotes a positioning portion for aligning a phase between the two cages 23 and 24. The positioning portion 29 is formed for example by notches 29b formed at the periphery of one (e.g. cage 23) of the two cages 23 and 24 and by projections 29a formed at the periphery of the other (e.g. cage 24) of the two cages 23 and 24. Each of the notches and projections engages each other to prevent shifting of the pitch of the pockets 25 and 26 of the cages 23 and 24. Securement of the cages 23 and 24 can be carried out by a staking type or a pin/aperture securing type securing method in place of the notch/projection type mentioned above.

Figure 6:
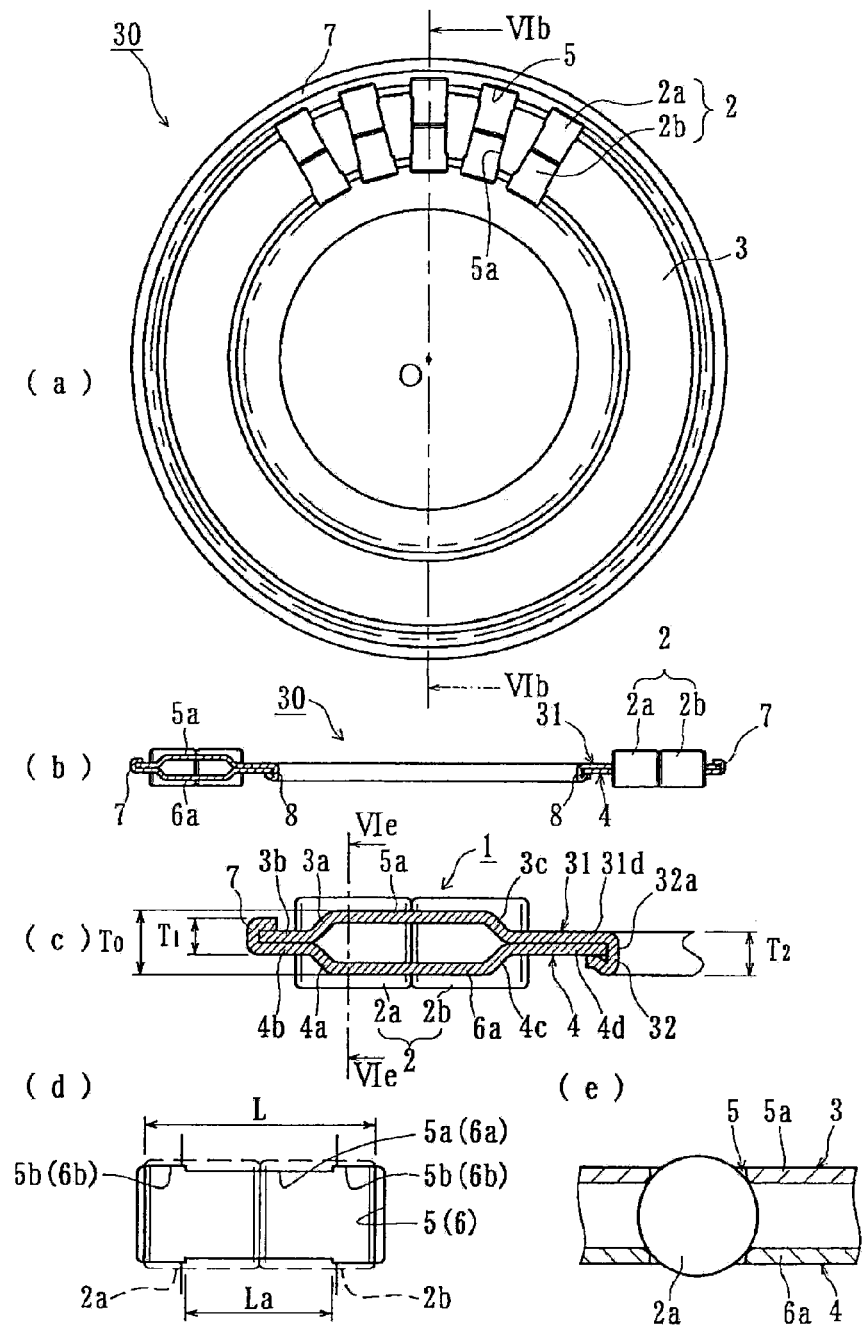
FIG. 6(a) is a plan view of a fifth embodiment of a thrust needle roller bearing according to the present invention.
FIG. 6(b) is a cross-section view taken along a line VIb-VIb in FIG. 6(a)
FIG. 6(c) is a partially enlarged view of FIG. 6(b)
FIG. 6(d) is a partially enlarged view of a pocket portion in FIG. 6(a)
FIG. 6(e) is an enlarged cross-section view taken along a line VIe-VIe in FIG. 6(c)

FIG. 6(a) is a plan view of a fifth embodiment of a thrust needle roller bearing according to the present invention. FIG. 6(b) is a cross-section view taken along a line VIb-VIb in FIG. 6(a). FIG. 6(c) is a partially enlarged view of FIG. 6(b). FIG. 6(d) is a partially enlarged view of a pocket portion in FIG. 6(a). FIG. 6(e) is an enlarged cross-section view taken along a line VIe-VIe in FIG. 6(c). The fifth embodiment only differs from the first through fourth embodiments by the securing means of two cages. Accordingly, the same parts as those in the first through fourth embodiments are designated by the same reference numerals also in this embodiment.

The thrust needle roller bearing 30 has a plurality of needle rollers 2 and two annular cages 31 and 4 for holding the needle rollers 2 at a predetermined pitch along their periphery. The two cages 31 and 4 have a plurality of pockets 5 and 6, respectively. Each pocket 5 and 6 has an elongated rectangular configuration having a length in a radial direction longer than the length or height "L" of each needle roller. The cages 31 and 4 are press formed from a steel sheet for example of cold rolled steel (SPCC). Either side of each pocket 5 and 6 is formed with oppositely projected roller holding portions 5a and 6a to sandwich the needle rollers 2 therebetween. The cages 31 and 4 may also be formed by drawing from a band steel such as SCM 415.

As shown in FIG. 6(c), a radially outward portion of the roller holding portion 5a of one (e.g. cage 31) of the two cages 31 and 4 has an inclined portion 3a folded at the radially outward end of the roller holding portion 5a. An outer flat portion 3b extends radially outward from the end of inclined portion 3a. Similarly, the cage 31 has, at the radially inward end of the roller holding portion 5a, an inclined portion 3c folded at the radially inward end of the roller holding portion 5a. An inner flat portion 31d extends radially inward from the end of inclined portion 3c.

The roller holding portion 6a of the other (i.e. cage 4) of the cages 31 and 4 can be pocket stamped by the same die used for punching the other cage 31. A radially outward portion of the roller holding portion 6a has an inclined portion 4a folded at the radially outward end of the roller holding portion 6a. An outer flat portion 4b extends radially outward from the end of inclined portion 4a. Similarly, the cage 4 has, at the radially inward end of the roller holding. portion 6a. An inclined portion 4c folded at the radially inward end of the roller holding portion 6a and an inner flat portion 4d extending radially inward from the end of inclined portion 4c.

The two cages 31 and 4 are formed with a caulked portion 7. The outer flat portions 3b and 4b are superimposed upon one another and the radially outermost end of the outer flat portion 4b is folded onto the other outer flat portion 3b. Similarly, a caulked portion 32 is formed by superposing the inner flat portions 31d and 4d upon one another. The radially innermost end of the inner flat portion 31d is folded over the other inner flat portion 4d. Thus the two cages 31 and 4 are never separated from one another since they are strongly united at their radially outermost and innermost ends by the caulked portions 7 and 32. At the outer flat portions 3b and 4b and inner flat portions 31d and 4d, it is possible to suppress drilling abrasion since the outer flat portions 3b and 4b and inner flat portions 31d and 4d slidingly contact with the central areas of the rollers 2 and thus a large contact area between the ends of the needle rollers 2 and the pockets 5 and 6 can be obtained.

The caulked portion 32 is formed so that the radially innermost end of the inner flat portion 31d is axially folded over a distance beyond the thickness of the inner flat portion 4d. In the illustrated embodiment, the distance is about 2 times the thickness of the inner flat portion. The end is further folded onto the other inner flat portion 4d. Accordingly, the axially extending flat portion 32a has a length more than the total thickness of the superimposed inner flat portions 31d and 4d of the two cages 31 and 4. This amounts to at least about 3 times the thickness of each inner flat portion 31d and 4 remarkably exceeding the length in the prior art. Thus, it is possible to prevent the oil film from being cut by the axially extending portion 32a and also to largely reduce the contact surface pressure. Accordingly, abnormal abrasion and peeling can be prevented. Thus, the durability of the bearing can be remarkably improved.

When two cages 31 and 4 are secured, due to the presence of the inclined portions 3a, 4a and 3c, 4c, both an axial thickness "T1" of the radially outward portion of the roller holding portions 5a and 6a and an axial thickness "T2" of the radially portion of the roller holding portions 5a and 6a are smaller than an axial thickness "T0" of the roller holding portions 5a and 6a.

Figure 7:
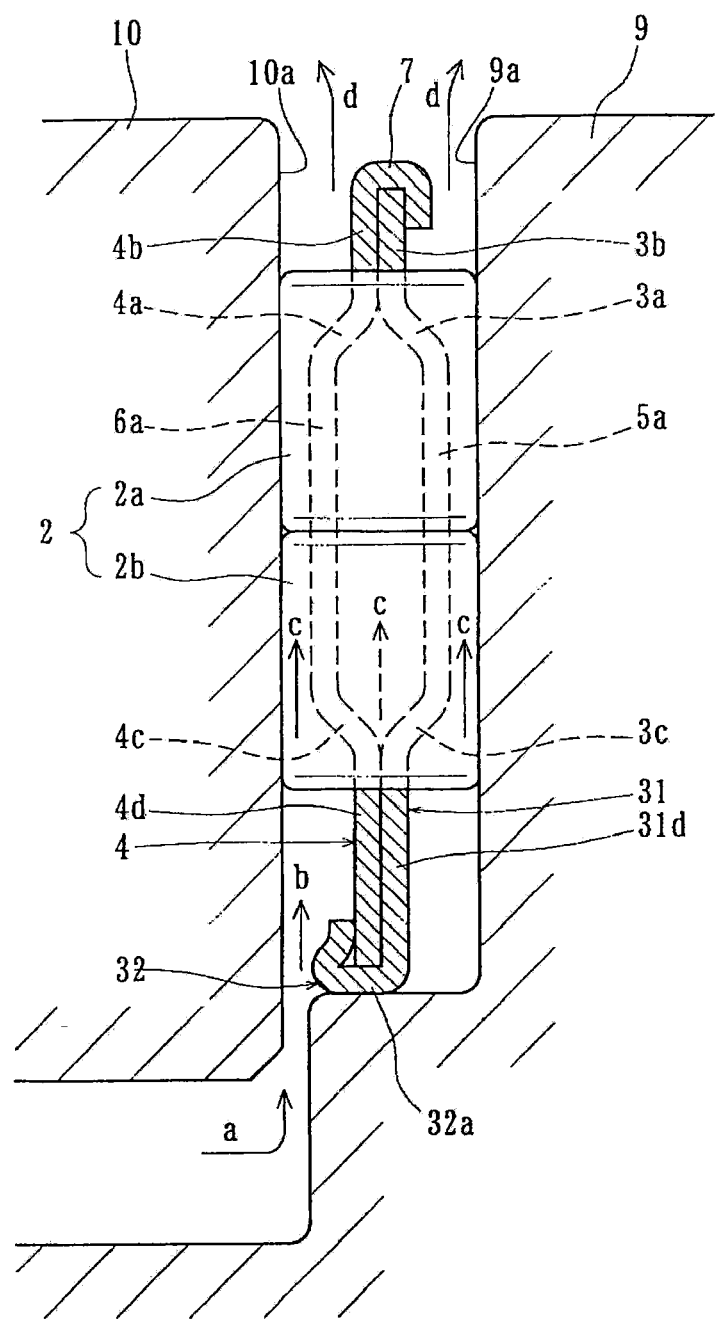
FIG. 7 is a partial cross-section view showing a condition of use of a thrust needle roller bearing of the present invention.

As shown in FIG. 7, the thrust needle roller bearing 30, having a structure mentioned above, can be loose fitted by arranging the caulked portion 8 as a guiding surface between a raceway surface 9a of a first shaft (rotational shaft) 9 and a raceway surface 10a of a second shaft (stational shaft) 10. When the first shaft 9 rotates, the cages 3 and 4 are also rotated together with the first shaft 9. The needle rollers 2 are rotated between the raceway surface 9a of a first shaft 9 and the raceway surface 10a of a second shaft 10. Lubricant is supplied by a source (not shown) into the bearing 30 via an oil passage.

The lubricant can flow from the oil passage along a line "a" into a space between the raceway surface 10a of the second shaft 10 and the radially inward portion relative to the roller holding portion 6a of the cage 4 along a line "b". The lubricant can flow into a space formed by the rollers 2 and the cages 3 and 4 along lines "c". The lubricant passes by a portion between rollers 2 and the roller holding portions 5a and 6a, a portion between the end surfaces and the roller holding portions 5a and 6a, and a portion between the rollers 2 and the raceway surfaces 9a and 10a. Finally, the lubricant is exhausted from a space between the raceway surface 10a of the second shaft 10 and the radially outward portion relative to the roller holding portion 6a and a space between the raceway surface 9a of the first shaft 9 and the radially outward portion relative to the roller holding portion 6a along lines "d".

Since the axial thickness "T1" of the radially outward portion relative to the roller holding portions 5a and 6a and the axial thickness "T2" of the radially inward portion relative to the roller holding portions 5a and 6a are smaller than the axial thickness "T0" of the roller holding portions 5a and 6a, the cross-section area of the space between the raceway surface 10a of the second shaft 10 and the roller holding portion 6a of the cage 4 is enlarged as compared with the case of the prior art. Accordingly, not only the flow-out ability of the lubricant but the flow-in ability can be improved. Thus, the drilling abrasion between the end surfaces of rollers 2 and pockets 5 and 6 of the cages 31 and 4 is reduced. In addition, since the flow of lubricant is not interrupted by the cages 31 and 4 and thus the residence of lubricant within the cages 31 and 4 is prevented, it is possible to suppress a temperature rise of lubricant and therefore to improve the durability of the bearing.

Since the axially extending portion 32a of the caulking portion 32 has an area larger than that of the prior art bearing, it is possible, due to the reduction of the contact surface pressure, to prevent the generation of abnormal abrasion and peeling even if the axially extending portion 32a comes into sliding contact with the first shaft 9 when the bearing 30 is shifted to an eccentric position. Accordingly, it is possible to use the bearing of the invention under severe conditions such as lean lubricant and high speed rotation in vehicle automatic transmissions and air compressors to further improve the durability of the bearing.

Figure 8:
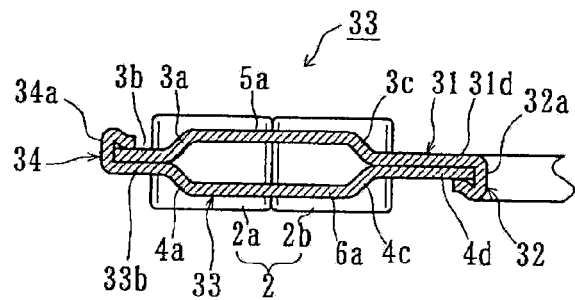
FIG. 8 is a partially enlarged view of a sixth embodiment of a thrust needle roller bearing according to the present invention.

FIG. 8 is a partially enlarged view of a sixth embodiment of a thrust needle roller bearing according to the present invention. This embodiment is different from the fifth embodiment only in the configuration of the radially outward portion of the cages. Accordingly, the same parts as those in the fifth embodiment are designated by the same reference numerals in this embodiment.

The thrust needle roller bearing 33 has a plurality of needle rollers 2 and two annular cages 31 and 33 to hold the needle rollers 2 at a predetermined pitch along their periphery. A radially outward portion of the roller holding portion 5a of one (e.g. cage 31) of the two cages 31 and 33 has an inclined portion 3a folded at the radially outward end of the roller holding portion 5a. An outer flat portion 3b extends radially outward from the end of inclined portion 3a. A radially outward portion of the roller holding portion 6a has an inclined portion 4a folded at the radially outward end of the roller holding portion 6a. An outer flat portion 33b extends radially outward from the end of inclined portion 4a. The roller holding portion 6a of the other (i.e. cage 33) of the cages 31 and 33 can be pocket stamped by the same die used to punch the other cage 31. A radially outward portion of the roller holding portion 6a has an inclined portion 4a folded at the radially outward end of the roller holding portion 6a. An outer flat portion 33b extends radially outward from the end of inclined portion 4a.

The two cages 31 and 33 are formed with a caulked portion 34 by superimposing the outer flat portions 3b and 33b upon one another. The radially outermost end of the outer flat portion 33b is axially folded over a length more than the thickness of the outer flat portion 3b (in the illustrated embodiment, 3 times the thickness of the flat portion 3b), and finally by folding onto the other outer flat portion 3b. In this embodiment, the area of the caulked portions can be increased not only in the axially extending portion 32a of the caulked portion 32 at the radially inward portion but in the axially extending portion 34a of the caulked portion 34 at the radially outward portion as compared to the prior art. Thus, the contact surface pressure can be remarkably reduced. It is a matter of course that such a caulking portion may be formed only in the radially outward portion.

Figure 9:
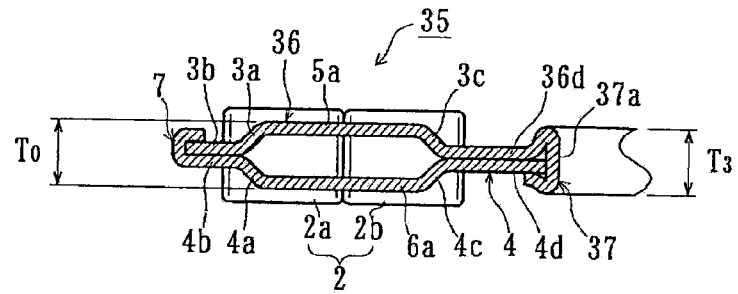
FIG. 9 is a partially enlarged view of a seventh embodiment of a thrust needle roller bearing according to the present invention.

FIG. 9 is a partially enlarged view of a seventh embodiment of a thrust needle roller bearing according to the present invention. This embodiment is different from the sixth embodiment only in the configuration of the radially inward portion of the cages. Accordingly, the same parts as those in the sixth embodiment are designated by the same reference numerals in this embodiment.

The thrust needle roller bearing 35 has a plurality of needle rollers 2 and two annular cages 36 and 4 to hold the needle rollers 2 at a predetermined pitch along their periphery. A radially outward portion of the roller holding portion 5a of one (e.g. cage 36) of the two cages 36 and 4 has an inclined portion 3a folded at the radially outward end of the roller holding portion 5a. An outer flat portion 3b extends radially outward from the end of inclined portion 3a. A radially outward portion of the roller holding portion 5a has an inclined portion 3c folded at the radially inward end of the roller holding portion 5a. An inner flat portion 36d extends radially inward from the end of inclined portion 3c.

The roller holding portion 6a of the other (i.e. cage 4) of the cages, 36 and 4 has an inclined portion 4a folded at the radially outward end of the roller holding portion 6a. An outer flat portion 4b extends radially outward from the end of inclined portion 4a. Similarly, a radially outward portion of the roller holding portion 6a has an inclined portion 4c folded at the radially inward end of the roller holding portion 5a. An inner flat portion 4d extends radially inward from the end of inclined portion 4c.

The two cages 36 and 4 are formed with a caulked portion 37. The inner flat portions 36d and 4d are superimposed upon one another. The radially innermost end of the inner flat portion 36d is folded slightly in the axial direction and then reversely turned and finally folded Onto the other inner flat portion 4d. In this embodiment, since the area of the axially extending portion 37a of the caulked portion 37 can be further increased as compared with that of the axially extending portion 32a of the sixth embodiment, the contact surface pressure can be further reduced. The axial thickness "T3" of the radially innermost portion is formed smaller than "T0" of the roller holding portions 5a and 6a. Accordingly, not only the flow-out ability of the lubricant but the flow-in ability can be improved. Thus, the seizure of bearing parts can be prevented. In addition, since the flow of lubricant is not interrupted by the cages and thus the residence of lubricant within them is prevented, it is possible to suppress a temperature rise of lubricant. This improves the durability of the bearing.

Figure 10:
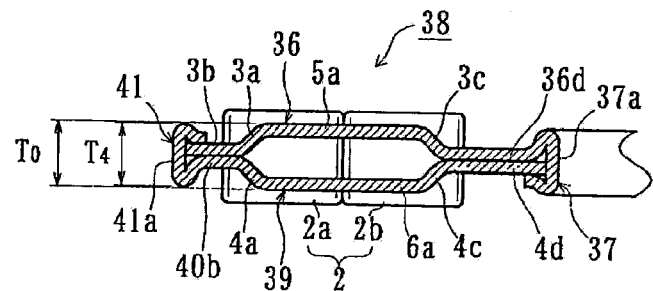
FIG. 10 is a partially enlarged view of an eighth embodiment of a thrust needle roller bearing according to the present invention.

FIG. 10 is a partially enlarged view of an eighth embodiment of a thrust needle roller bearing according to the present invention. This embodiment is different from the seventh embodiment only in the configuration of the radially outward portion of the cages. Accordingly, the same parts as those in the seventh embodiment are designated by the same reference numerals in this embodiment.

The thrust needle roller bearing 38 has a plurality of needle rollers 2 and two annular cages 36 and 39 to hold the needle rollers 2 at a predetermined pitch along their periphery. A radially outward portion of the roller holding portion 5a of one (e.g. cage 36) of the two cages 36 and 39 has an inclined portion 3a folded at the radially outward end of the roller holding portion 5a. An outer flat portion 3b extends radially outward from the end of inclined portion 3a. The roller holding portion 6a of the other (i.e. cage 39) of the cages 36 and 39 can be pocket stamped by the same die used to punch the other cage 36. A radially outward portion of the roller holding portion 6a has an inclined portion 4a folded at the radially outward end of the roller holding portion 6a. An outer flat portion 40b extends radially outward from the end of inclined portion 4a.

The two cages 36 and 39 are formed with a caulked portion 41. The outer flat portions 3b and 40b are superimposed upon one another. The radially outermost end of the outer flat portion 40b is folded slightly in an axial direction and then reversely turned and finally folded onto the other outer flat portion 3b. In this embodiment, the axial thickness "T4" of the radially outermost portion is formed smaller than that "T0" of the roller holding portions 5a and 6a. Accordingly, the areas of the axially extending portions are increased not only at the caulked portion 37 of the radially innermost portion but at the caulked portion 41 of the radially outermost portion. Thus, the contact surface pressure against the mating parts can be reduced.

Figure 11:
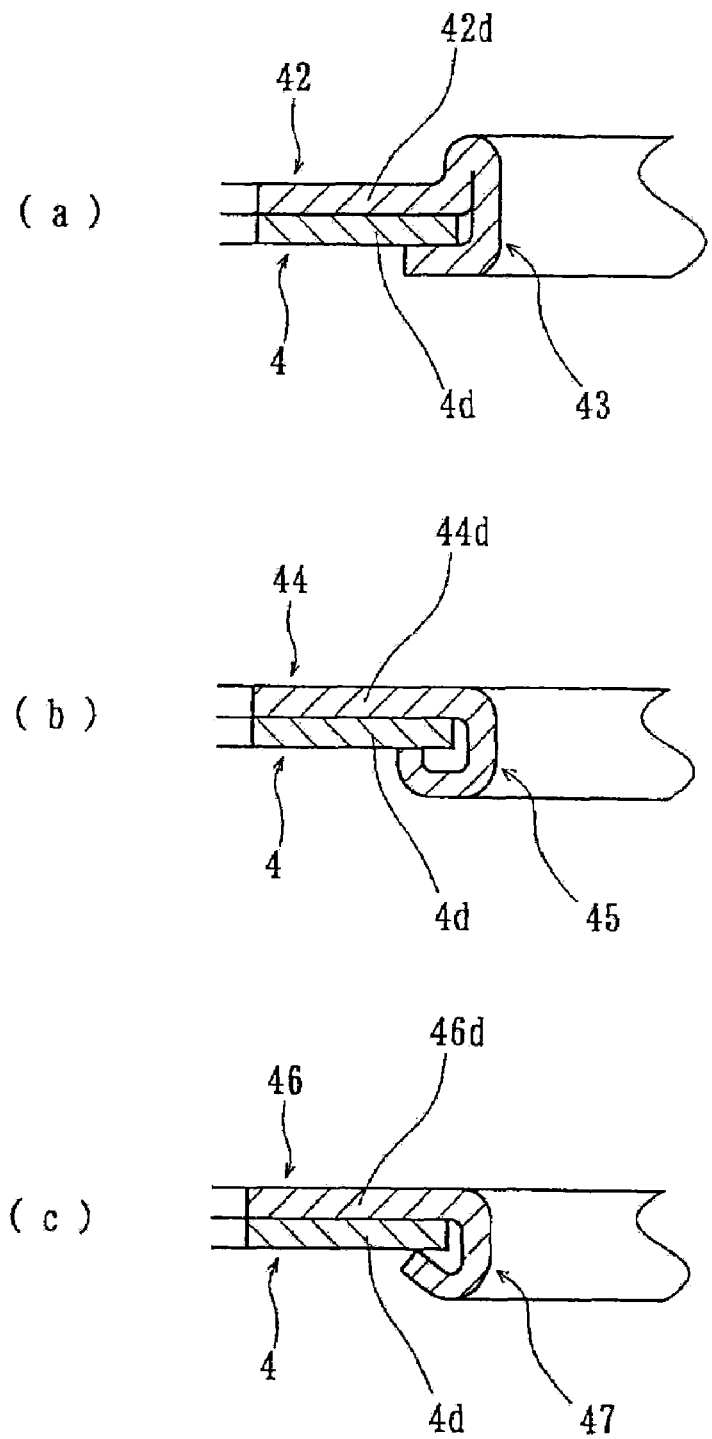
FIG. 11(a) is a partially enlarged view of another embodiment of cages of a thrust needle roller bearing according to the present invention.
FIG. 11(b) is a partially enlarged view of an other embodiment of cages of a thrust needle roller bearing according to the present invention.
FIG. 11(c) is a partially enlarged view of a further embodiment of cages of a thrust needle roller bearing according to the present invention.
Figure 12:
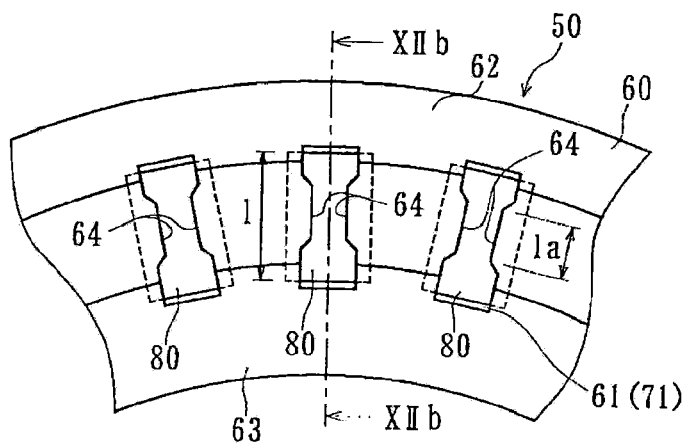
FIG. 12(a) is a partial plan view showing a thrust needle roller bearing of the prior art.
FIG. 12(b) is a cross-section view taken along a line XIIb-XIIb in FIG. 12(a)
FIG. 12(c) is a cross-section view taken along a line XIIc-XIIc in FIG. 12(c).
Figure 12:
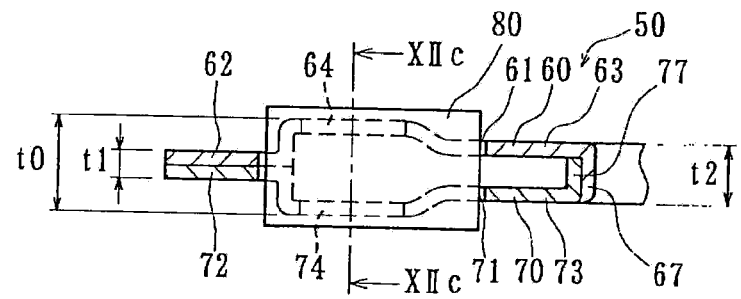
Figure 12:
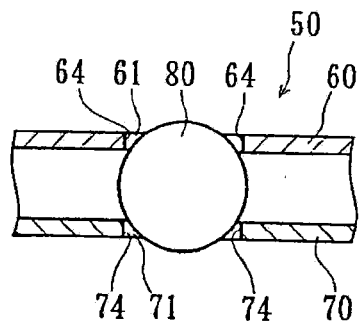

FIGS. 11(a), (b) and (c) are partially enlarged views each showing another embodiment of cages of a thrust needle roller bearing according to the present invention. The embodiment of FIG. 11(a) is a modification of the seventh embodiment (FIG. 9) in which a caulked portion 43 is formed by superimposing inner flat portions 42d and 4d of two cages 42 and 4 upon one another. The radially innermost end of the inner flat portion 42d is folded slightly in the axial direction and then reversely turned, and finally an end of the axially extending portion is folded at a right angle onto the other inner flat portion 4d. The embodiment of FIG. 11(b) is an embodiment in which a caulked portion 45 is formed by superimposing the inner flat portions 44d and 4d of two cages 44 and 4 upon one another. The radially innermost end of the inner flat portion 44d is axially folded and finally an end of the axially extending portion is reversely turned onto the other inner flat portion 4d at a right angle relative to its surface in a curled manner. The embodiment of FIG. 11(c) is a modification of the embodiment of FIG. 11(b) in which a caulked portion 47 is formed by superimposing the inner flat portions 46d and 4d of two cages 46 and 4 upon one another. The radially innermost end of the inner flat portion 46d is axially folded. Finally, an end of the axially extending portion is reversely turned onto the other inner flat portion 4d at about 45° relative to its surface. All of these caulked portions can increase their axially extending portions and thus can reduce the contact surface pressure against a mating member.

The present invention has been described with reference to the preferred embodiment. Obviously, modifications and alternations will occur to those of ordinary skill in the art upon reading and understanding the preceding detailed description. It is intended that the present invention be construed as including all such alternations and modifications insofar as they come within the scope of the appended claims or the equivalents thereof.

What is claimed is:

1. A thrust needle roller bearing comprising:
   a plurality of needle rollers and two annular cages, each of the cages being formed with a plurality of pockets each having a radial length longer than the height of the roller, each one of the two annular cages holding the needle rollers by sandwiching the needle rollers between the two cages within roller holding portions formed in the pockets of each annular cage and said roller holding portions projecting from a wall defining said pocket for contacting said needle rollers;
   the radial length of each of the roller holding portions of the two cages is formed shorter than the radial length of the pocket;
   the two cages are assembled by folding them as a unit so that both the portions of the unit on either a radially outer and radially inner side of the roller holding portions have their axial thickness smaller than that of the opposing roller holding portions and the portions of the unit on the radially outer and radially inner side are axially offset from both the roller holding portions; and
   the two cages are secured to one another at both their radially outermost and innermost end portions.

2. A thrust needle roller bearing according to claim 1 wherein the two cages are superimposed upon one another at portions radially outside or inside the roller holding portions.

3. A thrust needle roller bearing according to claim 1 wherein the axial thickness of the secured portions is at least 3 times the thickness of each cage.

4. A thrust needle roller bearing according to claim 1 wherein the two cages are secured to one another by spot welding.

5. A thrust needle roller bearing according to claims 1 wherein notches are formed at the periphery of one of the two cages and projections are formed at the periphery of the other of the two cages each engaging one of the notches.

6. A thrust needle roller bearing according to claim 1 wherein corners of the roller holding portions are rounded.

7. A thrust needle roller bearing according to claim 1 wherein an entire surface of the cage is formed with a hardened layer having the surface hardness more than 600 Hv.

8. A thrust needle roller bearing according to claim 1 wherein the two cages are secured to one another by plastically deforming their radially outermost and innermost end portions.

9. A thrust needle roller bearing according to claim 8 wherein the two cages are secured to one another by caulking radially outermost and innermost end portions of either one of the two cages on the other one.

10. A thrust needle roller bearing according to claim 8 wherein the two cages are secured to one another by caulking either one of the radially outermost and innermost end portions of the two cages.

11. A thrust needle roller bearing according to claim 8 wherein the two cages are secured to one another by partially caulking them at several positions along their periphery.

12. A thrust needle roller bearing according to claim 8 wherein the two cages are secured to one another by folding radially outermost and innermost end portions of either one of the two cages over the other one.

13. A thrust needle roller bearing according to claim 8 wherein the two cages are secured to one another by folding either one of the radially outermost and innermost end portions of the two cages.

14. A thrust needle roller bearing according to claim 1 wherein double row needle rollers are arranged within each pocket of the cage.

15. A thrust needle roller bearing according to claim 14 wherein the needle roller arranged radially outward of the double row needle rollers has a length longer than that of the needle roller arranged radially inward.

* * * * *

UNITED STATES PATENT AND TRADEMARK OFFICE
CERTIFICATE OF CORRECTION

PATENT NO. : 7,273,318 B2 Page 1 of 1
APPLICATION NO. : 10/611030
DATED : September 25, 2007
INVENTOR(S) : Tetsuya Hayashi et al.

It is certified that error appears in the above-identified patent and that said Letters Patent is hereby corrected as shown below:

Column 3
line 57, "oh" should be --on--

Column 7
line 11, "Ti" should be --T1--
line 11, "gradially" should be --radially--
line 54, after "flow-in ability is", insert --improved. Thus, the drilling abrasion between the end surfaces of rollers 2 and pockets 5 and 6--

Column 10
line 55, after "of the", delete "in the".

Signed and Sealed this

Eighteenth Day of December, 2007

JON W. DUDAS
*Director of the United States Patent and Trademark Office*